(12) United States Patent
Lin

(10) Patent No.: US 9,731,233 B2
(45) Date of Patent: Aug. 15, 2017

(54) MODULAR FILTER CAPSULE APPARATUS

(71) Applicant: Saint-Gobain Performance Plastics Corporation, Solon, OH (US)

(72) Inventor: ZhenWu Lin, Pasadena, CA (US)

(73) Assignee: Saint-Gobain Performance Plastics Corporation, Solon, OH (US)

( * ) Notice: Subject to any disclaimer, the term of this patent is extended or adjusted under 35 U.S.C. 154(b) by 0 days.

(21) Appl. No.: 15/231,766

(22) Filed: Aug. 8, 2016

(65) Prior Publication Data

US 2016/0346717 A1 Dec. 1, 2016

Related U.S. Application Data

(62) Division of application No. 13/441,028, filed on Apr. 6, 2012, now Pat. No. 9,409,108.

(51) Int. Cl.
| | |
|---|---|
| *B01D 35/153* | (2006.01) |
| *F16L 37/42* | (2006.01) |
| *B01D 35/147* | (2006.01) |
| *B01D 27/10* | (2006.01) |
| *F16L 29/00* | (2006.01) |
| *B01D 46/42* | (2006.01) |
| *B01D 46/00* | (2006.01) |
| *B01D 35/15* | (2006.01) |
| *B01D 46/54* | (2006.01) |

(52) U.S. Cl.
CPC .......... *B01D 35/153* (2013.01); *B01D 27/106* (2013.01); *B01D 35/147* (2013.01); *B01D 35/15* (2013.01); *B01D 46/0013* (2013.01); *B01D 46/42* (2013.01); *B01D 46/4272* (2013.01); *B01D 46/543* (2013.01); *F16L 29/007* (2013.01); *F16L 37/42* (2013.01); *B01D 2201/167* (2013.01); *B01D 2201/184* (2013.01); *B01D 2201/4038* (2013.01); *B01D 2265/027* (2013.01)

(58) Field of Classification Search
None
See application file for complete search history.

(56) References Cited

U.S. PATENT DOCUMENTS

| | | | | |
|---|---|---|---|---|
| 4,629,159 | A * | 12/1986 | Wellenstam | A61M 39/26 137/614.18 |
| 5,139,747 | A * | 8/1992 | Cato | B01D 53/74 422/122 |
| 5,242,581 | A * | 9/1993 | Mohr | B01D 29/114 137/528 |
| 5,477,883 | A * | 12/1995 | Totten | B65D 77/067 137/614.03 |
| 5,651,887 | A * | 7/1997 | Posner | B01D 35/147 210/232 |

(Continued)

*Primary Examiner* — Thomas M Lithgow
(74) *Attorney, Agent, or Firm* — Lorusso & Associates

(57) ABSTRACT

Disclosed is a disposable filter capsule apparatus that incorporates integral quick connect components and check valves to facilitate assembly to, and dis-assembly from, larger assemblies and apparatus. The quick connect elements and valves are configured to eliminate the need for auxiliary sealing elements, e.g., o-rings and valve springs so as to prevent unwanted reactions with fluids and/or gases flowing through the capsules, and to further prevent the disposal of expensive re-usable elements in the disposable capsules.

20 Claims, 5 Drawing Sheets

(56) References Cited

U.S. PATENT DOCUMENTS

| | | | |
|---|---|---|---|
| 7,562,906 B2* | 7/2009 | Schmidt | F16L 37/42 285/308 |
| 2010/0276922 A1* | 11/2010 | Rehder | F16L 37/0841 285/26 |

* cited by examiner

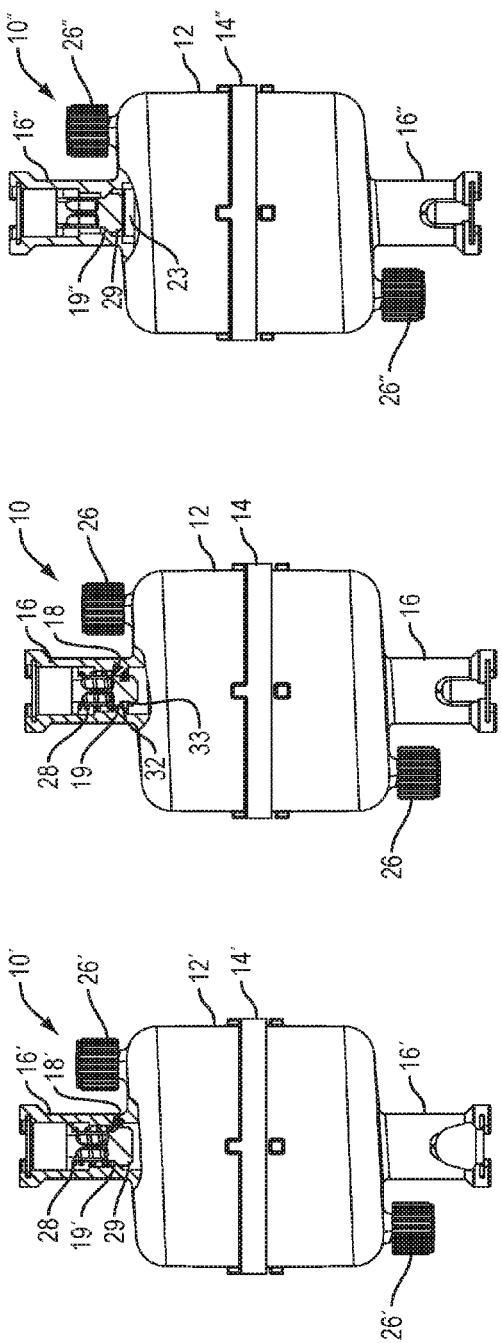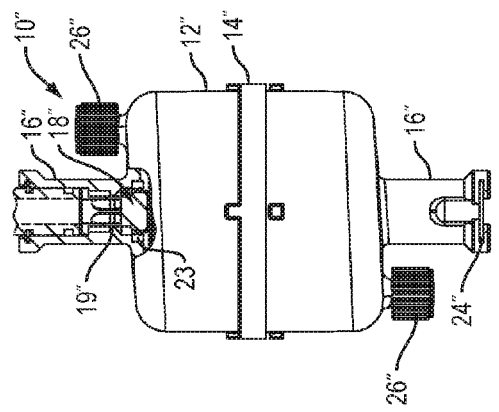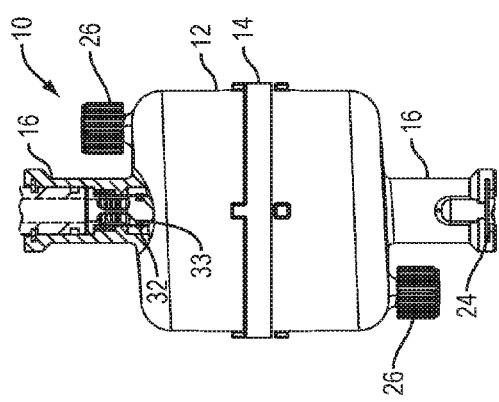

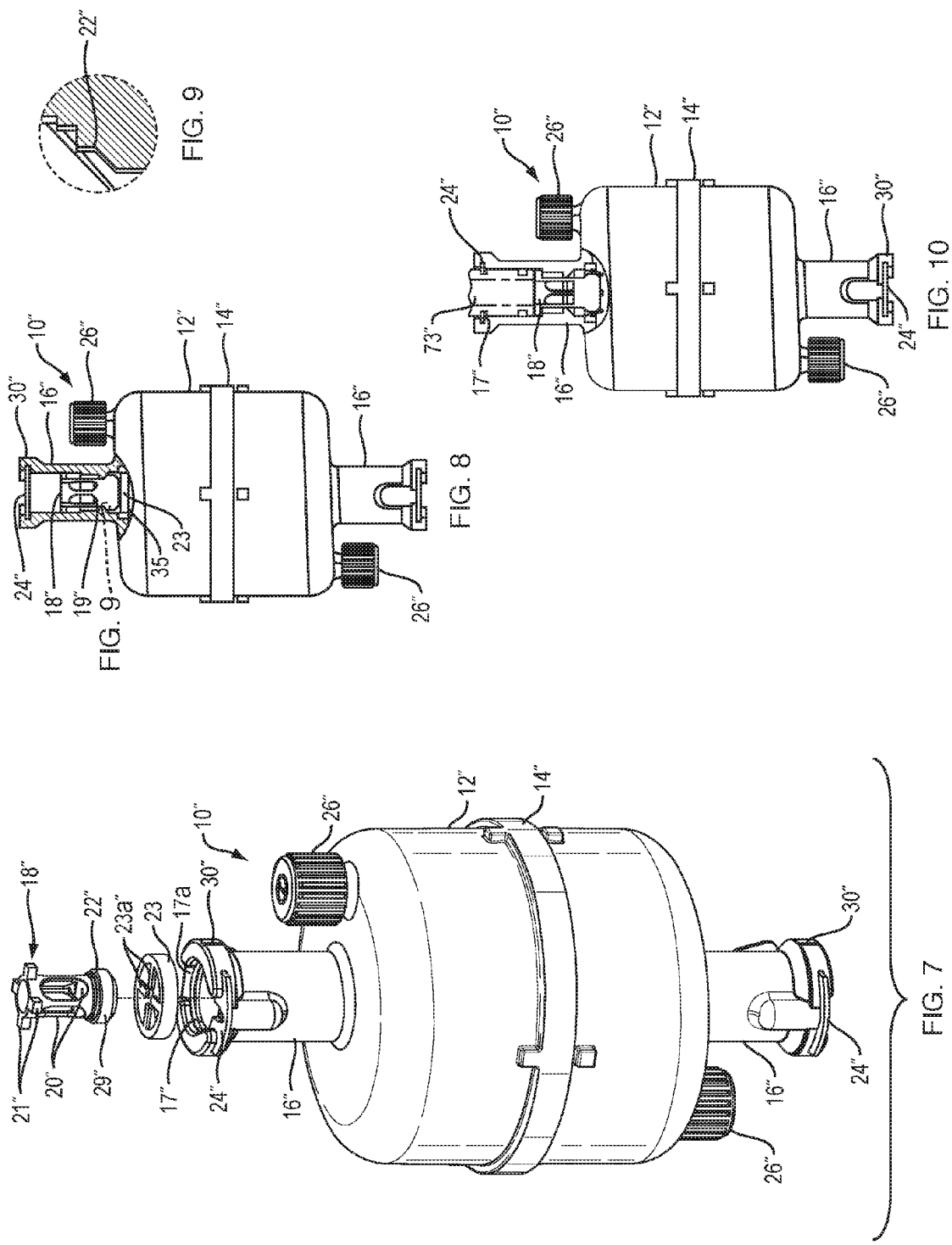

MODULAR FILTER CAPSULE APPARATUS

CROSS-REFERENCE TO RELATED APPLICATIONS

This is a divisional application of U.S. Regular Utility application Ser. No. 13/441,028, filed Apr. 6, 2012, now U.S. Pat. No. 9,409,108, issued Aug. 9, 2016, to which a claim of priority is made and the contents of which are incorporated in their entirety herein by reference.

FIELD OF THE DISCLOSURE

The disclosure relates to filter capsules having housings used to enclose filters that separate and remove solid, liquid and/or gaseous contaminants and/or intermix and introduce one fluid or gas into a second fluid or gas. More particularly, the disclosure concerns disposable filter capsules having integrated quick-connect and check valve components to improve assembly to, and disassembly from, larger assemblies and apparatus.

BACKGROUND OF THE DISCLOSURE

To filter fluids and/or gases of undesired contaminants, filters enclosed in housings or capsules are used to effectuate contaminant removal. Some capsules are designed for permanent incorporation into larger apparatuses wherein the filter component(s) is/are replaced as needed. In other applications, the filter capsule is permanently sealed and the entire capsule is removed and discarded. For disposable units, additional consideration has to be given to the means used to secure the capsules to larger assemblies so as to minimize the disposal of otherwise expensive and possibly reusable internal components.

As is commonly known in the filter capsule art, capsule ports, either integral or modular in design, come in a variety of connection configurations including threaded female quick couplings secured to a capsule with corresponding threading, hose barb, tri-clamp, compression fittings, and molded male quick couplings. Although female quick couplings are typically connected via threading, the couplings may also be attached to a hose barb or like feature with a hose and clamps.

Once assembled to a capsule, the fittings permit the capsule to be connected to larger assemblies with corresponding, complimentary fittings. Each of the fitting configurations disclosed above requires one or more specific implements or tools to effectuate a proper, functional connection. Whether the implement be a wrench, screw driver, pneumatic or electric torque tool, and the like, each means used to secure a fitting requires adequate space to allow a tool access to the fittings. This inevitably requires apparatus and capsule designs to include dimensional accommodations so as to provide additional space about the fittings that would otherwise be unnecessary to accommodate any of the capsule's or larger assembly's components—except, of course, to allow access to the fittings.

A further consideration with respect to disposable capsules is to prevent spillage of fluids and/or gases resident in a capsule when the capsule is removed for disposal. Preventing the undesirable release of similar substances in the elements of the larger assembly attached to the capsule, such as hoses, pipes and the like is an equally important consideration. Accordingly a means is needed to prevent the unwanted release of fluids and/or gases from larger assemblies having attached filter capsules and from the capsules themselves, particularly with respect to potentially hazardous materials when a capsule is removed from a larger assembly. Some form of fluid/gas retention components is needed to secure the ports when the capsule is dis-assembled from the larger apparatus.

A yet further consideration is the selection of materials used construct the internal components of the capsule. Material selection is often influenced by the fluids and/or gases introduced into the capsule. The capsule components, e.g., o-rings and valve springs have to be made of materials that do not react with the introduced fluids and/or gases so as to prevent the formation and possible release of undesirable substances and contaminants into the fluid and/or gas stream. Any such reactions may also lead to component degradation and failure. O-ring material, in particular, can often be incompatible with the intended fluids and/or gases. Degradation of o-ring seals can lead to leaking joints and contaminated fluids and/or gases. This problem can significantly limit the applications to which a filter capsule can be utilized.

What is needed is a disposable capsule that incorporates fittings that allow removal of the capsule without the unwanted release of contained fluids and/or gases. What is further needed are connector fittings that reduce the space needed to assemble and dis-assemble the capsule to and from larger assemblies. What is still further needed is a capsule design that does not incorporate reusable, expensive components. What is yet further needed is a filter capsule that eliminates the need for internal capsule components that can undesirably react to fluids and/or gases introduced into the capsule. These and other objects of the disclosure will become apparent from a reading of the following summary and detailed description of the disclosure as well as a review of the appended drawings.

SUMMARY OF THE DISCLOSURE

In one aspect of the disclosure, a filter capsule includes a pair of ports each constructed with integral female quick connect fittings. A check valve is incorporated into each port to prevent fluid/gas flow into or out of the capsule when in a closed position. The check valve includes a valve spring to bias the valve in a closed position. An o-ring positioned in the port provides a seal and a valve seat for the check valve.

In another aspect of the disclosure, a filter capsule includes a pair of integral ports, each constructed with integrated female quick connect fittings. A check valve is also incorporated into each fitting to prevent the flow of fluids and/or gases into or out of the capsule when in a closed position. The check valve includes a valve spring configured to bias the valve in a closed position until a corresponding fitting is secured to the female fitting. A shoulder is formed in the integral ports to register against a face of the check valve, the combination of which forms a substantially leak-free face seal.

In a yet further aspect of the disclosure, a filter capsule is formed with a pair of integrated ports having integrated female quick connect fittings. A check valve is incorporated into each port to prevent the unwanted flow of fluids and/or gases into or out of the capsule when the valve is in a closed position. Portions of the check valve form a series of increasingly larger diameter annular substantially concentric rings that form an angular serrated surface cross-section that forms a seal when registered against an annular frustoconical surface formed inside each port.

In another aspect of the disclosure, the ports include quick coupling fittings to facilitate expedient, efficient and reliable connection and disassembly to larger assemblies or to dedicated ingress or egress tubes. Each coupling may be configured as either a male or female fitting to accommodate a variety of connection configurations and requirements. Each coupling may further be configured to include a check valve integrated with either a male or female configured fitting. In place of a valve biasing spring, a valve retention lever or valve retention ring secures the valve in a closed position until portions of a corresponding, complimentary fitting register against the fitting and valve and overcome the closing force of the retention lever. These and other aspects of the disclosure will become apparent from a review of the appended drawings and a reading of the following detailed description of the disclosure.

BRIEF DESCRIPTION OF THE DRAWINGS

FIG. 1 is a side partial sectional view of a filter capsule with an inlet port configured with a female fitting and a check valve assembly in a closed position including a valve stem with a face seal segment and a valve spring according to one aspect of the disclosure.

FIG. 2 is a side partial sectional view of a filter capsule with an inlet port and valve assembly in an open position according to the aspect of the disclosure shown in FIG. 1.

FIG. 3 is a side partial sectional view of a filter capsule with an inlet port configured with a female fitting and a check valve assembly in a closed position including a valve stem with a valve spring and an o-ring valve seat according to another aspect of the disclosure.

FIG. 4 is a side partial sectional view of a filter capsule with an inlet port and valve assembly in an open position according to the aspect of the disclosure shown in FIG. 3.

FIG. 5 is a side partial sectional view of a filter capsule with an inlet port configured with a female fitting and a check valve assembly in a closed position including a valve stem with a face seal and a valve retention ring according to a further aspect of the disclosure.

FIG. 6 is a side partial sectional view of a filter capsule with an inlet port and valve assembly in an open position according to the aspect of the disclosure shown in FIG. 5.

FIG. 7 is a partially exploded perspective view of the filter capsule configured according to the aspect of the disclosure shown in FIG. 5.

FIG. 8 is a side partial sectional view of a filter capsule with an inlet port and valve assembly in a closed position and constructed according to the aspect of the disclosure shown in FIGS. 5 and 6.

FIG. 9 is a sectional view of the valve stem face seal according to the aspects of the disclosure shown in FIGS. 1, 5 and 8.

FIG. 10 is a side partial sectional view of a filter capsule with an inlet port and valve assembly in an open position and constructed according to the aspect of the disclosure shown in FIGS. 5 and 6.

DETAILED DESCRIPTION OF THE DISCLOSURE

Figure 12:
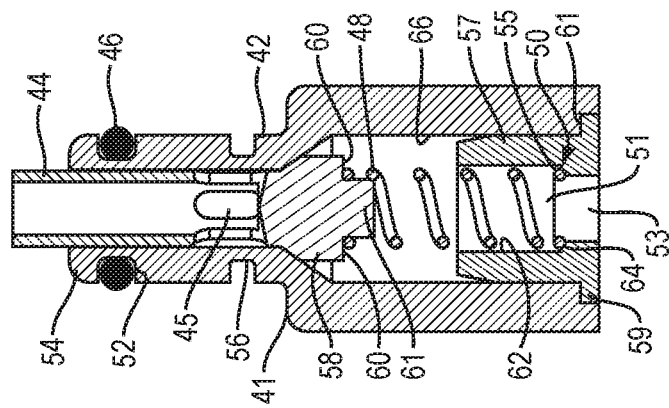
FIG. 12 is a sectional view of the male fitting shown in FIG. 11.

Referring to FIGS. 3 and 4, in one aspect of the disclosure, a filter capsule apparatus is shown generally as 10. Capsule 10 includes a substantially cylindrical body 12 that defines a generally hollow filter chamber configured to hold one or more filters (not shown). Capsule 10 may be formed in other regular or irregular geometric shapes internally and/or externally to accommodate dimensional and configuration needs of larger assemblies to which the capsule is attached and/or to accommodate a wide variety filter shape configurations depending upon the application. A cylindrical embodiment will be used for illustrative purposes.

Body 12 may be constructed in halves, dimensionally identical or non-identical with a midline or offset seam, to allow for the insertion of a filter. The halves are joined and fused together at seam 14 via friction fit, interference fit with mechanical interlocking features, adhesive, sonic welding and like. Seam 14 may be configured as a permanent seal, or as a releasable seal, particularly if mechanical interlocking features such a threading, key and slot configurations, and bayonet-style locking features are used.

Extending outwardly from body 12 are ports 16. Ports 16 may be positioned at any locations on the capsule body provided the locations promote the flow of fluid introduced into the capsule through the filter. One port will function as an inlet while the other shall function as an outlet. It is within the contemplation of the disclosure to have more than two ports including two or more inlets, two or more outlets and combinations thereto. Each port 16 has portions defining a port chamber. A top end of the port chamber is open to receive fluids and/or gases delivered via tubes and other like elements connected to the port. A bottom end of the port chamber is in fluid communication with the capsule main chamber defined by capsule body 12.

It should be understood that the flow of fluids and/or gases through the various ports can be reversed without any reduction in function of the filter capsule. More specifically, what has been identified as an inlet port may function as an outlet port and what has been identified as an outlet port may function as an inlet port. In addition, what has been identified as a vent port may be utilized as either an inlet, or an outlet port. The apparatus is designed to permit functional flow in either direction.

For purposes of this disclosure, any reference to a "downward direction" will refer to portions of a capsule element located relatively proximal to the main body of the capsule or movement of fluids and/or gases toward the capsule main body regardless of the spatial or referential orientation of the capsule. Any reference to an "upward or outward direction" will refer to portions of a capsule element located relatively distal from the main body of the capsule or movement of fluids and/or gases away from the capsule main body. Any reference to a "bottom" of an element will refer to that portion of the element proximal or closest to the capsule main chamber. Any reference to a "top" of an element will refer to that portion of the element distal or furthest from the capsule main chamber.

The selection of which port to use as an inlet is driven by the orientation of the capsule to a larger assembly. Each port may function as either an inlet port or an outlet port. The enclosed filter may be constructed for one-way or bi-directional flow. The filter may also be constructed with hydrophilic and hydrophobic sections, dedicated hydrophilic and/or hydrophobic layers in multi-layer configurations and combinations thereof. The configuration of the filter used can dictate which port will function as an inlet.

Also extending from the capsule are one or more vent ports 26 used to allow for off-gassing of unwanted trapped air or fluids and/or to register the internal pressure of the capsule to ambient pressure. Vent ports 26 are initially opened to vent out resident gas when capsule 10 is being filled with the desired fluid and/or gas. The vent ports are otherwise closed during normal operation, or periodically opened for limited periods of time to allow for the release of unwanted accumulated air and/or gas in the filter chamber. In the illustrative embodiment, vent ports 26 are formed on radially opposing ends of capsule body 12 to ensure and to maximize air and/or gas evacuation regardless of the capsule orientation.

Referring again to ports 16 as shown in FIGS. 3, 4, 13 and 14, each port has portions defining an integral quick connect fitting. In the illustrative embodiment, two female quick connect fittings are shown in the referenced figures. It should be understood the use of two male quick connect fittings or combinations of male and female quick connect fittings is within the contemplation, scope and spirit of the disclosure. Each female fitting includes a substantially annular flange 30 having portions defining an inner annular channel 17 configured to receive a locking sleeve 24 configured and dimensioned to slide radially inwardly and outwardly within channel 17. Channel 17 is further connected to an external slot 17a configured and dimensioned to receive an exposed portion of sleeve 24 as shown in FIG. 7.

Sleeve 24 is biased with a spring or other like element to remain in a closed/locked position. This ensures any fitting secured to the capsule will remain secured until the deliberate application of a force to disengage sleeve 24 from a resident fitting. A spring-actuated locking pin 76 secures sleeve 24 in a locked position. Pin 76 is positioned in a bore formed in the annular top surface of the port so as to orient the pin orthogonal to the plane occupied by the top surface. A bottom end of pin 76 and a pin biasing spring (not shown) is housed in pin housing 74 formed, or attached to, outer wall 70 of port 16. A sleeve-releasing latch 78 is secured to flange 30 and has portions extending within channel 17, the ends of which register against sleeve 24.

Figure 11:
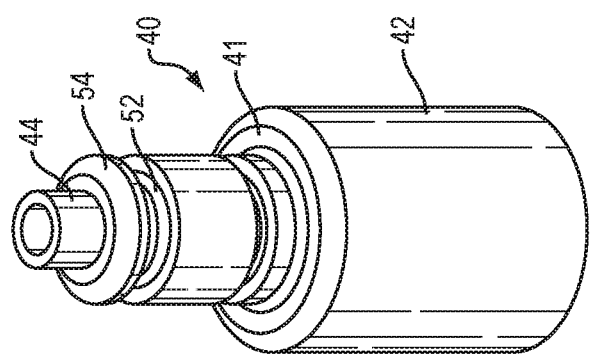
FIG. 11 is a top, side perspective view of a male fitting corresponding to, and complimentary to, the female fittings shown in FIGS. 1-10 according to one aspect of the disclosure.
Figure 14:
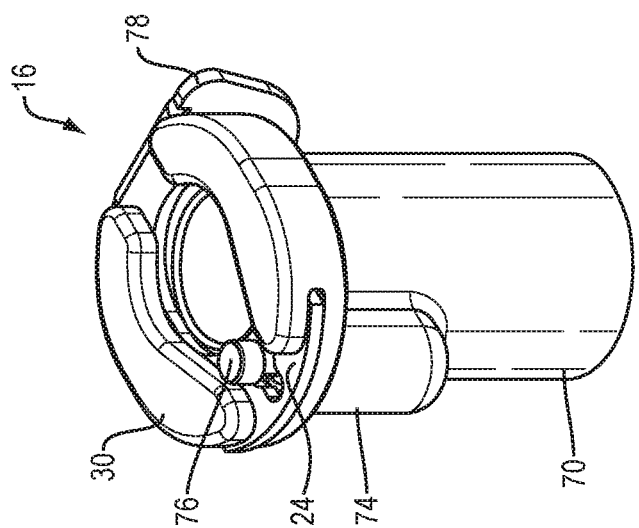
FIG. 14 is a top, side perspective view of the inlet/outlet port shown in FIG. 13.
Figure 13:
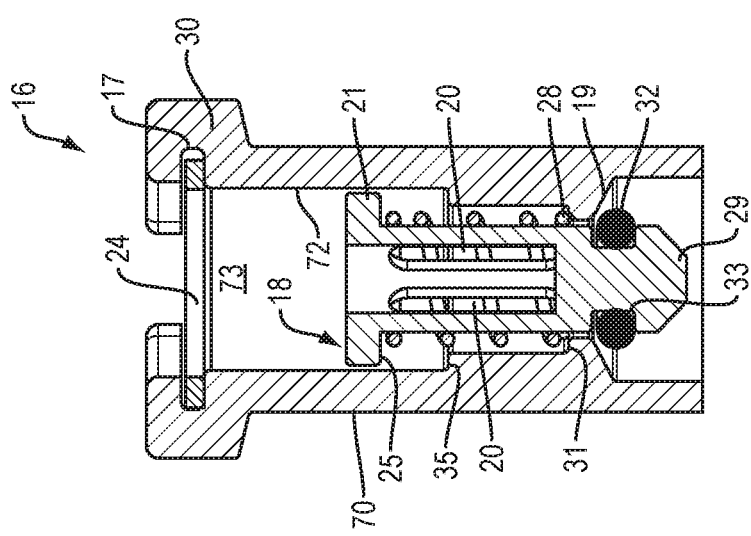
FIG. 13 is a side sectional view of an inlet/outlet port with an integral female fitting and a check valve assembly in a closed position including a valve stem with a valve spring and an o-ring valve seat according to the aspect of the disclosure shown in FIGS. 3 and 4.
Figure 16:
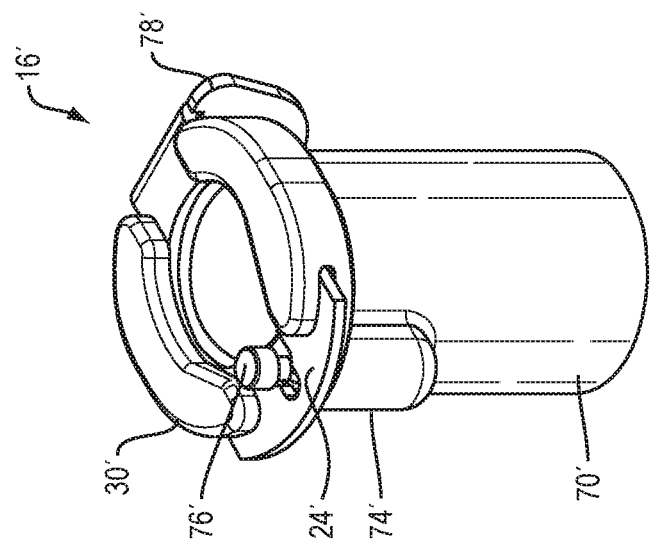
FIG. 16 is a top, side perspective view of the inlet/outlet port shown in FIG. 15.
Figure 15:
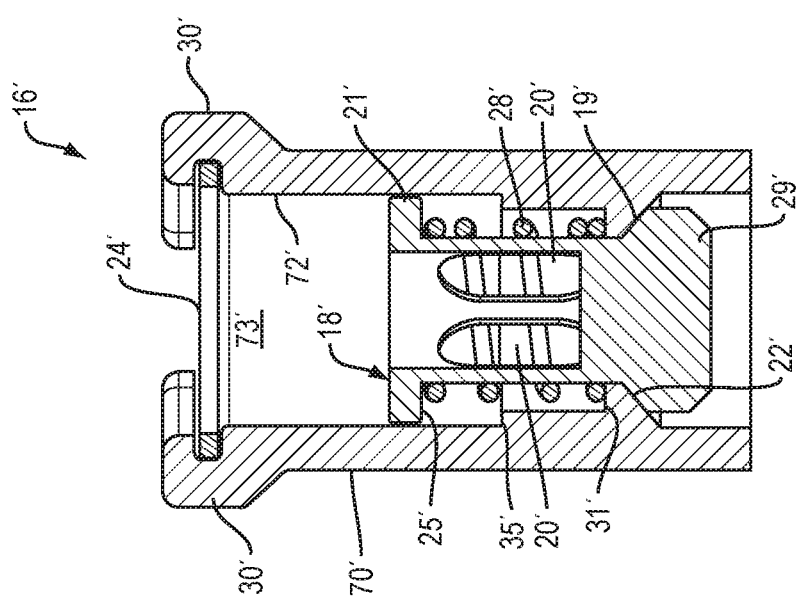
FIG. 15 is a side sectional view of an inlet/outlet port with an integral female fitting and a check valve assembly in a closed position including a valve stem with a face seal and a valve spring according to the aspect of the disclosure shown in FIGS. 1 and 2.

Radial displacement of sleeve 24 is accomplished by exerting a force on the sleeve with a male fitting such as shown in FIGS. 11 and 12 more fully disclosed below, or by mechanically retracting sleeve 24 radially outwardly by hand or with the assistance of an appropriate gripping tool as is well known in the art, or by activation of latch 78.

When latch 78 is depressed radially inwardly by manual force, portions of the latch registered against sleeve 24 urge the sleeve radially outwardly into an open position. This causes a key slot in sleeve 24 to travel along (radially stationary) pin 76 that extends through the slot. Once the enlarged key-hole portion of the slot passes the plane occupied by pin 76, pin 76, due to it complimentary dimension, is dislodged from the restricting surfaces of the narrower portion of the slot so as to be disengaged and urged upwardly by the force of the spring. When pin 76 is in an "up" position, portions of pin 76 now in registration with sleeve 24 mechanically block sleeve 24 from travelling back to the locked position.

Insertion of male fitting 40 into port 16 is required to re-set pin 76 to allow for sleeve 24 to move back to the locked position. As fitting 40 moves into port 16 an annular shoulder 41 engages pin 76 and urges pin 76 downwardly into a sleeve-release position. The downward movement of pin 76 releases lock sleeve 24 and permits the sleeve to move inwardly about pin 76 so as to register against and engage an annular channel formed on the outer surface of male fitting 40 so as to secure the fitting in a locked relation with port 16. A more detailed description of male fitting 40 and the method of engagement to port 16 is disclosed below.

Port 16 is substantially cylindrical in shape and has an inner wall 72 that defines a substantially cylindrical chamber 73 in fluid communication with a main chamber defined by capsule body 12. The junction of the inner wall 72 and the main body inner wall forms an annular, tapered, partially frustoconical transition shoulder 19 that functions as a valve seat for a check valve assembly. The smaller diameter end of the taper is positioned upwardly toward the port top while the larger diameter end of the taper is positioned toward the capsule main body. It should be understood the degree of taper and the continuity of the taper can be adjusted to receive different valve configurations. The taper may also be replaced with a series of stepped annular shoulders with each shoulder having an incrementally smaller cross sectional diameter so as to collectively form a tapered transition from the capsule main body to the port.

Secured in the port chamber is a check valve comprising a valve stem 18 configured and dimensioned to slide along a longitudinal axis of the port. The check valve provides a means to prevent the release of fluids or spillage when capsule 10 is assembled to a larger apparatus or disassembled for replacement or service. As shown more specifically in FIG. 13, stem 18 is formed as an elongate, substantially hollow cylinder with a plurality of lateral ports 20 defined by an outer wall of the stem. It should be understood the overall shape and dimensions of the stem are configured to be complimentary to, and to correspond with, the port chamber. Any modification of the metric structure of the port chamber will include a corresponding modification of the valve stem configuration.

Lateral ports 20 provide fluid communication between the inner valve chamber and port chamber 73 and increase the overall area available for fluid and/or gas intake (or egress if the port is used as an exit port). Extending radially from a top portion of stem 18 are valve flanges 21. In the illustrative embodiment shown in FIG. 7, four flanges are formed extending from stem 18. Flanges 21 are dimensioned to fit within port chamber 73 so as to allow the substantially free translational movement of stem 18 within the port chamber, but with sufficiently tight tolerances to ensure the valve is maintained centered in the chamber throughout its range of movement. The gaps between the flanges provide channels for fluids and/or gases to enter the port and flow around and through the valve stem when placed in an open position.

In an alternative embodiment, flanges 21 do not create an entire ring around the valve stem top, but are formed as a ribbed flange to maintain alignment of valve stem 18 in port 16 during translational movement within the port and to maximize the area for fluid flow into the capsule. It should be understood that fluids and/or gases introduced into the port will envelope the valve down to the sealing portion of the valve located at the bottom of the valve stem 18 whether or not the valve is in an open or closed position when port 16 is connected to a fluid and/or gas source.

A bottom end 29 of stem 18 has portions defining an annular channel 33 dimensioned and configured to receive an o-ring 32. O-ring 32 is dimensioned and configured for insertion into channel 33 and is assembled to, and secured in, channel 33 after valve stem 18 has been inserted into port 16. It should be understood the method of assembling o-ring 32 to valve stem 18 does not impact its function as a staling means as long as o-ring 32 is properly seated in channel 33.

O-ring 32 may be constructed from common elastomers, e.g., silicon, nitrite, EPDM, fluoroelastomers such as Viton®. The choice of material may be dictated by the fluids and/or gases to be introduced into the capsule. The o-ring materials should be selected so as not to react with the and/or gases.

An outer annular surface of o-ring 32 extends radially proud of the valve stem outer wall so as to register against shoulder 19 when stem 18 is positioned in port chamber 73. When valve stem 18 is in a closed position, o-ring 32 registers against port shoulder 19 and prevents the flow of fluids and/or gases, introduced into the port, into the main capsule chamber.

To secure valve stem 18 in a closed position, a substantially cylindrical helical coil valve spring 28, axially loaded in tension, is positioned superposed about valve stem 18. A top end of spring 28 registers against a flange bottom surface 25 of flanges 21 while a bottom end registers against an annular spring support shoulder 31 formed at a lower end of the port inner wall. It should be understood shoulder 31 does not have to be continuous, but may be segmented as long as the surface area provided for spring registration is adequate to support and maintain the alignment of spring 28 within port 16. Anchored against shoulder 31, spring 28 maintains valve stem 18 in a closed, sealed position by urging o-ring 32 against transition shoulder 19. Spring 28 may be constructed from any metal-based, or non-metal, polymer-based material commonly used to fabricate springs as is well known in the art.

When a force sufficient to exceed the pre-set axial force of spring 28 is applied to the top of valve stem 18, such as by inserting a male fitting as shown in FIGS. 11 and 12 into port 16, valve stem 18 is urged downwardly into the main capsule chamber, which causes o-ring 32 to separate from transition shoulder 19. The annular gap formed by the retraction of valve stem 18 coupled with lateral ports 20 and the gaps between valve flanges 21 allows for the in-flow of fluids and/or gases for filtration. Conversely, if the port being opened is the outlet port, the gap formed allows for the egress of filtered fluids and/or gases past valve stem 18 and out the port.

To limit the downward travel of stem 18 into port chamber 73, a substantially annular valve stop shoulder 35 is formed to extend radially inwardly from inner wall 72 so as to provide a registration surface for flanges 21. More specifically, stem 18 travels downwardly into port chamber 73 until flange bottom surfaces 25 register against stop shoulder 35.

In another aspect of the disclosure as shown in FIGS. 1, 2, 9, 15 and 16, a port/valve configuration includes a face seal to eliminate the need for an o-ring seal. By eliminating the need for an o-ring, a source of possible contamination and unwanted reaction with introduced fluids and/or gases is also eliminated. This automatically broadens the potential applications for the novel capsule. Moreover, the cost associated with the incorporation of a potentially expensive component in the form of an o-ring may be avoided. This is of particular importance when the capsule is designed for complete periodic replacement within a replacement schedule that would otherwise not exceed or extend to the life expectancy of the o-ring. By eliminating the need for an o-ring, the disposal of an otherwise functional and expensive part is also avoided.

In this embodiment the filter capsule shown generally as 10' includes a similar construction to the embodiment shown in FIGS. 3 and 4. For purposes of this disclosure, primed reference character numbers refer to elements that correspond to similar, or the same, elements in other disclosed embodiments labeled with unprimed or differently primed numbers.

Capsule 10' includes a substantially cylindrical body 12' that defines a generally hollow filter chamber configured to hold one or more filters (not shown). Capsule 10' may be formed in other regular or irregular geometric shapes to accommodate dimensional and configuration needs of larger assemblies to which the capsule is attached and/or to accommodate a wide variety of filter shape configurations depending upon the application.

Like the embodiment shown in FIGS. 3 and 4, body 12' may be constructed in halves, identical or non-identical with an offset seam, to allow for the insertion of a filter. The halves are joined and fused together via friction fit, mechanical interlocking features, adhesive, sonic welding and like at seam 14'. Seam 14' may be configured as a permanent seal, or as a releasable seal to allow for filter replacement.

Extending outwardly from body 12' are ports 16'. Ports 16' may be positioned at any points on the capsule body so long as the locations promote the flow of fluid introduced into the capsule through the filter. One port will function as an inlet while the other shall function as an outlet. Like the embodiment shown in FIGS. 3 and 4, the capsule configuration may be constructed with a plurality of ports, each of which may have a dedicated function as an inlet or an outlet. Each port 16' has an inner wall 72' that defines a port chamber 73'. A top end of the port chamber is open to receive fluids and/or gases delivered via tubes and other like elements connected to port 16'. A bottom end of the port chamber is in fluid communication with the capsule main chamber defined by capsule body 12'.

Secured in each port chamber is a valve stem 18' configured and dimensioned to slide along a longitudinal axis of the port. Stem 18' is formed as an elongate, substantially hollow cylinder with a plurality of lateral ports 20' defined by an outer wall of the stem. It should be understood the overall shape and dimensions of the stem are configured to be complimentary to, and to correspond with, the port chamber. Any modification of the geometric structure of the port chamber will include a corresponding modification of the valve stem configuration.

Lateral ports 20' provide fluid communication between the inner valve chamber and the port chamber and increase the overall area available for fluid and/or gas intake (or egress if the port is used as an exit port). Extending radially from a top portion of stem 18' are valve flanges 21'. Flanges 21' are dimensioned to fit within the port chamber so as to allow for the substantially free translational movement of stem 18' within the port chamber, but with sufficiently tight tolerances to ensure the valve s maintained in a center position in the chamber throughout its range of movement. The gaps between the flanges provide channels for fluids and/or gases to enter the port and to flow around and through the valve stem when placed in an open position.

In an alternative embodiment, flanges 21' do not create an entire ring around the valve stem top, but are formed collectively as a ribbed flange to maintain alignment of valve stem 18' in port 16' during translational movement within the port and to maximize the area for fluid flow into the capsule. It should be understood that fluids and/or gases introduced into the port will envelope the valve down to the sealing portion of the valve located at the bottom of the valve stem 18' whether or not the valve is in an open or closed position when port 16' is connected to a fluid and/or gas source.

Referring again to FIGS. 1, 2, 9, 15 and 16, in place of annular channel 33 of valve stem 18, a bottom portion of stem 18' includes an annular, bulbous, substantially continuous bottom flange 29' dimensioned to have a cross-sectional diameter larger than the cross-sectional diameter of port chamber 73'. A top portion of flange 29' is formed with a plurality of concentrically oriented shoulders 22' each of which has a cross-sectional diameter sufficient to register against shoulder 19'. Collectively, shoulders 22' form a face seal when registered against port shoulder 19'. The use of multiple contact points along the length of shoulder 19' ensures a positive seal is created despite any manufacturing defects or imperfections in the formation of shoulder 19' or shoulders 22'.

It should be understood, the top portion of flange 29' may also be formed as a continuous, substantially smooth frustoconical surface with a taper complimentary to, and corresponding to, the frustoconical surface of transition shoulder 19'. This configuration increased the surface area of contact to form the face seal, but may not be as efficacious to account for manufacturing and surface defects of the contacting surfaces as is the construction using the plurality of shoulders 22'.

As flanges 29' and 29" (disclosed below) have cross-sectional diameters greater than the cross-sectional diameters of port chambers 73' and 73", respectively, insertion of valve stems 18' and 18" (disclosed more fully below), require the valve stems to be constructed in two segments. A first valve segment includes flange 29' (or flange 29" for the apparatus 10" embodiment) with features configured for a press-fit assembly. A second segment includes the upper portion of the valve stem with valve flanges 21' (or flanges 21" for the apparatus 10" embodiment) and the smaller cross-sectional diameter portion of the valve stem. The second segment is also constructed with, features corresponding to the first segment press-fit features to accommodate a press-fit assembly. It should be understood, the junction of the two segments can be at any location from above flange 19 to below valve flanges 21' (or flange 19" and flanges 21" for apparatus 10").

With respect to apparatus 10" constructed with retention ring 23, the first segment is inserted into port 16" from the interior of the capsule half from which port 16" extends. The second segment is inserted into port 16" from its top open end and press-fit into the first segment while an opposing force is applied to the first segment. Once the features interlock, valve stem 18' is ready for operation.

With respect to apparatus 10', the same procedure is followed to construct valve stem 18' except that a force sufficient to overcome the axial force of valve spring 28' has to be applied to the second segment as it is forced downwardly towards the first segment so as to engage the first segment and form the press-fit joint. As with apparatus 10", a force also has to be applied to the bottom of the first segment to prepare it for reception of the second segment. It should be understood the portions forming the press-fit joint for this embodiment (apparatus 10') have to be sufficiently robust to exceed the axial force of spring 28' when in a fully compressed position.

It should be further understood the two segments of the valve stems can be secured tog ether using alternative or additional means such as thermal fusion. The thermal fusion step may be accomplished by melting the joining surfaces of the two sag merits before assembly and allowing the joined segments to fuse together as the melted portions cool. An alternative fusion method is to apply ultrasonic fusion as is well known in the art.

Referring exclusively again to apparatus 10', like the embodiment shown in FIGS. 3 and 4, valve stem 18' is urged into a closed position by a valve spring 28'. The construction and positioning of valve spring 28' is essentially the same as valve spring 28. Valve spring 28' is a substantially cylindrical helical coil valve spring, axially loaded in tension, and superposed about valve stem 18'. A top end of valve spring 28' registers against bottom surface 25' of flanges 21' while a bottom end registers against an annular spring support shoulder 31' formed at a lower end of the port inner wall. Like shoulder 31, shoulder 31' does not have to be continuous, but may be segmented as long as the surface area provided for spring registration is adequate to support and maintain the alignment of spring 28' within port 16'. Anchored against shoulder 31', spring 28' maintains valve stem 18' in a closed, sealed position by urging bottom flange 29' against shoulder 19'.

When a force sufficient to exceed the pre-set axial force of spring 28' is applied to a the top of valve stem 18', such as by inserting a male fitting as shown in FIGS. 11 and 12 into port 16', valve stem 18' is urged downwardly into the main capsule chamber, which causes bottom flange 29' to separate from shoulder 19'. The annular gap formed by the retraction of valve stem 18' coupled with lateral ports 20' and the gaps between valve flanges 21' allows for the in-flow of fluids and/or gases for filtration. Conversely, if the port being opened is the outlet port, the gap formed allows for the egress of filtered fluids and/or gases past valve stem 18' and out the port. Once the force used to open the valve is removed or terminated, spring 28' urges stem 18' back into a closed position with flange 29' registered against transition shoulder 19'.

In a yet further aspect of the disclosure as shown in FIGS. 5-10, a port/valve configuration includes the previously disclosed face seal of apparatus 10' so as to eliminate the need for an o-ring seal and incorporates a valve retention ring to eliminate the need for a spring. The advantages of eliminating the o-ring in this embodiment are the same as set forth hereinabove. The elimination of the valve spring imparts similar advantages to those obtained with the elimination of the o-ring.

By eliminating the need for a valve spring, a further source of possible contamination and unwanted reaction with introduced fluids and/or gases is eliminated. This again, broadens the potential applications for the novel capsule. In addition, the cost associated with the construction and incorporation of a potentially expensive component in the form of a valve spring is avoided. This is of particular importance when the capsule is designed for complete periodic replacement within a replacement schedule that would otherwise not exceed or extend to the life expectancy of the valve spring. By eliminating the need for a valve spring, the disposal of an otherwise functional and expensive part is likewise avoided.

In this embodiment, a filter capsule shown generally as 10" includes a similar construction to the embodiments shown in FIGS. 1-4. Capsule 10" includes a substantially cylindrical body 12" that defines a generally hollow main filter chamber configured to hold one or more filters (not shown). Like the other embodiments, capsule 10" may be formed in other regular or irregular geometric shapes to accommodate dimensional and configuration needs of larger assemblies to which the capsule is attached and/or to accommodate a wide variety of filter shape configurations depending upon the application.

Like the embodiment shown in FIGS. 1-4, body 12" may be constructed in halves, identical or non-identical with an offset seam, to allow for the insertion of a filter. The halves are joined and fused together via friction fit, mechanical interlocking features, adhesive, sonic welding and the like at seam 14". Seam 14" may be configured as a permanent seal, or as a releasable seal to allow for filter replacement.

Extending outwardly from body 12" are ports 16". Ports 16" may be positioned at any points on the capsule body so long as the locations promote the flow of fluid introduced into the capsule through the filter. One port will be selected to function as an inlet while the other shall function as an outlet. Like the embodiment shown in FIGS. 1-4, the capsule configuration may be constructed with a plurality of ports, each of which may have a dedicated function as an inlet or an outlet. Each port 16" has portions defining a port chamber. A top end of the port chamber is open to receive fluids and/or gases delivered via tubes and other like elements connected to port 16". A bottom end of the port chamber is in fluid communication with the capsule main chamber defined by capsule body 12".

Secured in each port chamber is a valve stem 18" configured and dimensioned to slide along a longitudinal axis of the port. The means to secure valve stem 18" to port 16" is disclosed above. Stem 18" is formed as an elongate, substantially hollow (and segmented for assembly purposes) cylinder with a plurality of lateral ports 20" defined by an outer wall of the stem. It should be understood the overall shape and dimensions of the stem are configured to be complimentary to, and to correspond with, the port chamber. Any modification of the geometric structure of the port chamber will include a corresponding modification of the valve stem configuration.

Lateral ports 20" provide fluid communication between the inner valve chamber and port chamber 73" and increase the overall area available for fluid and/or gas intake (or egress if the port is used as an exit port) Extending radially from a top portion of stem 18" are valve flanges 21". Flanges 21" are dimensioned to fit within the port chamber so as to alloy for the substantially free translational movement of stem 18" within the port chamber, but with sufficiently tight tolerances to ensure the valve is maintained in a center position in the chamber throughout its range of movement. The gaps between the flanges provide channels for fluids and/or gases to enter the port and flow around and through the valve stem when placed in an open position.

In an alternative embodiment, flanges 21" do not create an entire ring around the valve stem top, but are formed as a ribbed flange to maintain alignment of valve stem 18" in port 16" during translational movement within the port and to maximize the area for fluid flow into the capsule. It should be understood that fluids and/or gases will envelope the valve down to the sealing portion of the valve located at the bottom of the valve stem 18" whether or not the valve is in an open or closed position when port 16" is connected to a fluid and/or gas source.

Referring again to FIGS. 5-10, like valve stem 18', valve stem 18" replaces an annular channel and o-ring with an annular, substantially continuous bottom flange 29' dimensioned to have a cross-sectional diameter larger than the cross-sectional diameter of the port chamber. A top portion of flange 29' is formed with a plurality of concentrically oriented shoulders 22' each of which has a cross-sectional diameter sufficient to register against shoulder 19". Collectively, shoulders 22" form a face seal when registered against port shoulder 19". As with embodiment shown in FIGS. 1 and 2, the use of multiple contact points along the length of shoulder 19" ensures a positive seal is created despite any manufacturing defects or imperfections in the formation of shoulder 19" or shoulders 22". Also like apparatus 10', the top portion of flange 29' may be formed with a substantially continuous smooth frustoconical surface to register against transition shoulder 19".

Unlike the other embodiments shown in FIGS. 1-4, valve stem 18" is urged into a closed position by a valve retention ring shown generally as 23 in FIG. 7 Retention ring 23 has a substantially circular perimeter in cross-section. An outer edge of ring 23 forms a circular rim 23b. Extending radially inwardly from rim 23b is one or more valve retention levers 23a that may, or may not extend to a point of mutual contact. The material used to construct ring 23 allows levers 23a to flex in a downwardly direction when a force is applied to valve stem 18".

Retention ring 23 is dimensioned and configured to fit within port 16". An annular shoulder 35 is formed in capsule body 12" below the location of, and substantially concentric with, shoulder 19" to provide a support surface against which ring 23 registers. Like shoulders 31 and 31' in the prior disclosed embodiments, shoulder 35 does not have to be continuous, but may be segmented as long as the surface area is adequate to support and maintain the alignment of retention ring 23 in port 16". Anchored against shoulder 35, retention ring 23 and the pre-set tension of levers 23a maintain valve stem 18" in a closed, sealed position by urging bottom flange 29" against shoulder 19". Ring 23 may be permanently secured to shoulder 35, or may simply be placed on the shoulder. Once valve stem 18" is inserted into the port, bottom flange 29" registers against ring 23 and combines with shoulder 35 to secure the ring in the port/capsule body junction.

To open the valve in this configuration, a force sufficient to exceed the pre-set tension force of ring 23 and levers 23a is applied to the top of valve stem 18", such as by inserting a male fitting as shown in FIGS. 11 and 12 into port 16". The application of force is transferred through valve stem 18" and exerted against levers 23a via flange 29" to urge the levers downwardly into the main capsule chamber. This causes bottom flange 29 to move downwardly and separate from shoulder 19" so as to form an annular gap between shoulder 19" and flange 29". The annular gap formed by the retraction of valve stem 18" coupled with lateral ports 20" and the gaps between valve flanges 21" allows for the in-flow of fluids and/or gases for filtration. Conversely, if the port being opened is the outlet port, the gap formed allows for the egress of filtered fluids and/or gases past valve stem 18" and out the port. Removal of the male fitting and/or removal of the pressure exerted against valve stem 18" returns the valve stem to the pre-biased closed position.

Referring now to FIGS. 11 and 12, a male fitting shown generally as 40 is configured and adapted for connection to the female quick connect fittings disclosed herein. Fitting 40 has a generally cylindrically-shaped main body 42 with an inner wall 66 defining a male port chamber. Extending from one end of fitting 40 is an integral sleeve housing 54 with an inner wall that defines a sleeve housing chamber in fluid communication with the male port chamber. Secured in sleeve housing 54 is a male insertion tube 44 dimensioned and configured to slide within the sleeve housing chamber. The dimensional tolerances between an outer wall of tube 44 and the inner wall of sleeve housing 54 are set to promote a substantially air-tight seal during tube translation within the sleeve housing. The lubricious properties of the materials used to construct tube 44 and sleeve housing 54 permit and facilitate the translational movement of tube 44 in housing 54.

Tube 44 has an inner wall that defines a tube chamber of which a proximal end is open to the atmosphere when not engaged with a female fitting. A proximal end of tube 44 extends from sleeve housing 54 so as to allow insertion into the open end of any embodiment of the female ports disclosed herein. A distal end of tube 44 has portions defining male lateral ports 45 which provide fluid communication between the tube chamber and the sleeve housing chamber when tube 44 is depressed into the housing chamber as disclosed below.

A plunger 58 having a generally cylindrical shape is configured and dimensioned to fit within sleeve housing 54 for registration against a distal end of tube 44. At one end, plunger 58 has portions defining a plunger shoulder 60 configured and dimensioned to receive a plunger spring 48. At the opposite end, the plunger is tapered to accommodate the tapered shape of the distal end of the sleeve housing. The tapered configuration ensures plunger 58 remains in a concentric relationship with sleeve housing 54. This ensures a positive seal. A distal tip of the plunger is configured to register against tube 44.

Spring 48 is a substantially cylindrical helical coil spring, axially loaded in tension, and dimensioned to fit within sleeve housing 54. The materials used to construct spring 48 are the same as disclosed for spring 28. Particular attention should be made to the selection of spring material as the spring is positioned so as to contact fluids and/or gases flowing through the fitting. One end of spring 48 registers against shoulder 60. A distal cylindrical projection 61 maintains spring 48 in concentric relationship with plunger 58. The other end of spring 48 is secured in a spring cap 50. Cap 50 has portions defining a spring chamber 51 dimensioned and configured to receive spring 48.

A bottom end of chamber 51 is defined by an annular chamber shoulder 55. Shoulder 55 provides a registration surface for spring 48. A further outlet chamber 53 formed concentric to, and in fluid communication with, chamber 51 provides a means to receive additional apparatus to allow for the flow of fluids and/or gases through male fitting 40.

Cap 50 has a generally cylindrical main body 57 dimensioned and configured for insertion into the male port chamber. An annular cap flange 59 registers against an annular cap channel 61 configured and dimensioned to receive cap flange 59. Cap 50 is secured to main body 42 via friction fit, mechanical interlock, adhesive, sonic weld, fusion bond, and the like. The combination of cap 50 and spring 48 urge plunger 58 against tube 44 to maintain the tube in a closed position.

Sleeve housing 54 has portions defining an annular o-ring chamber 52 dimensioned and configured to receive an o-ring 46. O-ring 46 provides a seal between the inner wall of female port 16 and the outer wall of housing 54 when the fittings are joined. Sleeve housing 54 has further portions defining an annular lock channel 56 dimensioned and configured to receive lock sleeve 24.

To connect male fitting 40 and female port 16, male fitting 40 is urged into port 16. The proximal end of tube 44 registers against valve stem 18 and urges the valve stem downwardly so as to open the fluid/gas channel in port 16 for access to the capsule main chamber. Substantially simultaneous with the movement of the valve stem, tube 44 is urged downwardly against plunger 58 so as to create a gap between plunger 58 and the tapered portion of inner wall 66. Movement of tube 44 into the male port chamber creates fluid communication between the male port chamber and the tube chamber via male lateral ports 45. Insertion of male fitting 40 is completed when sleeve housing 54 enters port 16 so as to engage the seal of o-ring 46 and lock sleeve 24 moves radially inwardly into lock channel 56 to lock the male and female fittings together after pin 76 is depressed by shoulder 41.

This configuration is particularly advantageous as o-ring 46 is not placed within the fluid and/or gas stream created when the capsule is attached to a lager assembly. When the spring-free and o-ring-free female port embodiment shown in FIGS. 5-10 is used in conjunction with the disclosed male fitting 40 no o-rings or springs in the female fitting (except spring 48 in male fitting 40) are exposed to the fluids and/or gases flowing through the filter capsule and associated couplings and tubes. The limitations of prior art systems are thus eliminated.

The materials used to construct capsule 10 and male fitting 40 and any variations and embodiments thereof may be the same for all the components. The components may be constructed via conventional injection molding processes well known in the art with any thermal plastic materials, including, but not limited to, acrylic, acrylonitrile-butadiene-styrene resins (ABS), Polypropylene (PP), Polyethylene (PE), nylon, Polysulfone, Perfluoroalkoxy (PFA) polymer resin, Polycarbonate (PC), PS, Polyethersulfone (PES), Ethylene-clorotrifluoroethylene copolymer (ECTFE), Polyvinylidene fluoride (PVDF), Polyoxymethylene (POM or Acetal) and mixtures thereof. The material used is primarily driven by the intended application of the filter capsule and the fluids, gases and conditions to which the capsule will be exposed, e.g., acidic fluids and high heat environments. It should be understood other materials and manufacturing methods well known in the art may be used to construct these components.

Retention ring 23 may be made of similar or different materials from the capsule and male fitting depending upon the amount of flexion desired for a particular configuration. As should be understood, the more internal pressure the capsule is exposed to, the less flexion retention ring 23 should have so as to ensure a seal is maintained in the capsule. In one illustrative embodiment, retention ring 23 should be sufficiently rigid to prevent fluid and/or gas leaks when exposed to pressures from about 0.001 MPa to about 0.5 MPa.

Each filter media may comprise one layer or multiple layers each having the same or different micron retention sizes. Filter pore sizes may range from about 0.01 microns to about 50 microns and up. The media may be constructed from a number of manufacturing processes including, but not limited to, wet-laid processes (similar to papermaking), wet casting, melt-cast, or dry processes such as air-laid, melt-blown, spun-bond, bi-directional stretching, etc. as is well known in the art.

Each filter media is constructed from microporous, hydrophilic or hydrophobic membranes, including, but not limited to, the materials such as poyethylene, polypropylene, nylon, polyethersulfone, polysulfone, cellulose acetate, Polytetrafluoro-ethylene (Teflon® PTFE), polyvinylidene fluoride (PVDF), and other fluoropolymers such as perfluoroalkoxy (PFA) and its derivatives, MFA (co-polymer of tetrafluoroethylene and perfluoromethyl vinyl ether and sold under the name Hyflon), fluorinated ethylene propylene polymer (FEP) and the like. The filter can also be constructed from fibrous material, including, but not limited to, microfibers and nanofibers of polyethylene, polypropylene, nylon, polyester, carbon, fiberglass, polypropylene sulfide (PPS), Polytetrafluoro-ethylene (Teflon® PTFE), cellulose including cellulose/diatomaceous earth or silica blends, cellulose/carbon particles or fibers, cellulose/ion exchange resins, as are available from general media suppliers, as well as combinations of any of the disclosed filter media materials.

The quick couplings, in modular or integral form, are configured to be compatible with coupling components manufactured and sold by, by way of example and not limitation, LinkTech (Ventura, Calif.), Colder Plastics Company (St. Paul, Minn.) and John Guest Corp. (Fairfield, N.J.). The check valves may be of any conventional variety known in the art that ensures one-way flow (or two-way flow when the valve is maintained in an open position) of fluids and/or gases that flow through the capsules. Examples include those sold by the aforementioned companies. It should further be understood that the male/female configuration of the set of quick-connect couplings incorporated onto a capsule may be all male, all female, or a combination of both depending upon the particular application.

In a yet further aspect of the disclosure, male connectors having two male ends may be used to connect two or more filter capsules having ports with integrated female connection fittings so as to form a filter train wherein each capsule of the train may enclose the same or different filters depending upon the particular application of the filer train. It should be further understood the disclosure also encompasses and contemplates filter capsules with ports having integrated male connection fittings attachable to corresponding female connectors and combinations thereof.

It should be further understood multiple filter capsules can be formed in a train with either detachable male and female fittings disclosed herein, or via fusing or bonding two or more capsules together as disclosed in my co-pending application, U.S. Ser. No. 61/562,190, the contents of which are incorporated in their entirety herein by reference. This construction enables the formation of long filter trains that do not impact the function of any of the filter media as the weight of each filter is limited and supported by the separate capsules. This construction also effectively eliminates the need for additional fittings and tubing between two or more capsules.

While the present disclosure has been described in connection with several embodiments thereof, it will be apparent to those skilled in the art that many changes and modifications may be made without departing from the true spirit and scope of the present disclosure. Accordingly, it as intended by the appended claims to cover all such changes and modifications as come within the true spirit and scope of the disclosure.

What I claim as new and desire to secure by United States Letters Patent is:

1. A disposable filter capsule apparatus comprising:
a capsule body having portions defining a filter chamber;
a filter secured in the chamber;
at least one inlet port having an inner wall defining a port chamber in fluid communication with the filter chamber wherein the port extends from the capsule body, and wherein an inner junction of the capsule body and the port forms a tapered annular wall having a small diameter end and a large diameter end, wherein the small diameter end connects to the port chamber;
a quick connect fitting integral to the at least one inlet port;
an O-ring-free and rigid dual-flange check valve secured in the at least one inlet port, wherein the check valve defines an inner valve chamber and comprises a bottom flange and a top flange, wherein the bottom flange has a frustoconically shaped upper surface, wherein the bottom flange upper surface has portions defining a plurality of concentrically oriented annular shoulders of consecutively larger cross-sectional diameters and arranged along the axial length of the bottom flange upper surface so as to collectively form a uniformly sloped, uniformly serrated, frusto-conical flange in cross-section, wherein the uniform slope of the combined annular shoulders is substantially parallel with the slope of the tapered annular wall, and wherein an annular apex of each annular shoulder registers against the tapered annular wall to form a multi-segmented face seal when the check valve is in a closed position; and,
a valve retention ring secured in the capsule body and registered against the check valve.

2. The filter capsule of claim 1 wherein the top flange extends radially outwardly from a top end of the check valve and is dimensioned to fit within the port chamber.

3. The filter capsule of claim 2, wherein the top flange further comprises a plurality of valve flange segments extending radially outwardly from a top surface of the top flange.

4. The filter capsule of claim 3 wherein the check valve further comprises at least one lateral port in fluid communication with the port chamber and the inner valve chamber.

5. The filter capsule of claim 3 wherein the valve stem comprises a first segment having portions defining a first segment press-fit surface and having the portions defining the flange, and a second segment having portions defining a second segment press-fit surface and having the plurality of valve flanges, wherein the first segment press-fit surface is connected to the second segment press-fit surface.

6. The filter capsule of claim 1 wherein the valve retention ring further comprises an annular perimeter ring with a plurality of flexible retention levers extending radially inwardly from the perimeter ring, wherein the plurality of retention levers register against the check valve stem.

7. The filter capsule of claim 6 wherein the plurality of retention levers register against one another at about a center point of the valve retention ring.

8. The filter capsule of claim 1 wherein the flange has portions defining a frustoconically shaped surface, wherein the surface registers against the tapered annular wall to form a face seal when the check valve is in a closed position.

9. The filter capsule of claim 1 wherein the port further comprises a top flange having portions defining a flange channel, and wherein the quick connect fitting is structured as a female fitting and comprises a locking sleeve engaged in the channel, a sleeve-releasing latch secured to the top flange and having portions engaged in the channel in registration with the locking sleeve and a locking pin secured in a bore formed in the wall of the port, wherein the sleeve has portions defining a slot, and wherein the locking pin passes through the slot.

10. The filter capsule of claim 1 wherein the quick connect fitting comprises a male quick connect fitting.

11. The filter capsule of claim 10 wherein the male fitting comprises:

a male fitting body having an inner wall defining a male port chamber;

an integral sleeve housing extending from the body, wherein the sleeve housing defines a sleeve housing chamber;

a male insertion tube having portions defining a tube chamber and male lateral ports in fluid communication with the housing chamber, wherein the insertion tube is dimensioned and configured to fit within the sleeve housing chamber, wherein the insertion tube can slide within the chamber, and wherein a distal end of the tube extends beyond a distal end of the sleeve housing; and, a plunger structured and dimensioned to fit within the sleeve housing, wherein the plunger has portions defining a tapered distal end, wherein the distal end registers against a proximal end of the insertion tube, and wherein the plunger has portions defining an annular plunger shoulder at a proximal end.

12. The filter capsule of claim 11 wherein the male quick connect fitting further comprises a spring secured in the male port chamber and a cap secured to a distal end of the male fitting body, wherein the cap has portions defining a spring chamber in fluid communication with the male port chamber and further portions defining an outlet port in fluid communication with the spring chamber, and wherein one end of the spring registers against the plunger shoulder and the other end of the spring registers against the cap.

13. The filter capsule of claim 12 further comprising an O-ring, wherein the sleeve housing has portions defining an annular outer O-ring channel formed proximal to a distal end of the sleeve housing, wherein the O-ring is secured in the O-ring channel.

14. The filter capsule of claim 13 further comprising an annular lock channel formed on the sleeve housing for receiving the locking sleeve of the female quick connect fitting when the male fitting and female fitting are merged together.

15. The filter capsule of claim 1, wherein the filter comprises a single layer with pore sizes from about 0.01 microns to about 50 microns.

16. The filter capsule of claim 1 wherein the filter comprises a plurality of membrane layers wherein each layer has the same pore size from about 0.01 microns to about 50 microns.

17. The filter capsule of claim 1 wherein the filter comprises a plurality of membrane layers wherein each layer has a different pore size each within the range of about 0.01 microns to about 50 microns.

18. The filter capsule of claim 1 wherein the filter comprises at least one microporous, hydrophilic or hydrophobic membrane, constructed from materials selected from the group consisting of polyethylene, polypropylene, nylon, polyethersulfone, polysulfone, cellulose acetate, Polytetrafluoro-ethylene (Teflon® PTFE), polyvinylidene fluoride (PVDF), perfluoroalkoxy (PFA) and its derivatives, MFA (co-polymer of tetrafluoroethylene and perfluoromethyl vinyl ether, fluorinated ethylene propylene polymer (FEP) and mixtures thereof.

19. The filter capsule of claim 1 wherein the filter comprises a fibrous material selected from the group consisting of microfibers and nanofibers of polyethylene, polypropylene, nylon, polyester, carbon, fiberglass, polypropylene sulfide (PPS), Polytetrafluoro-ethylene (Teflon® PTFE), cellulose including cellulose/diatomaceous earth or silica blends, cellulose/carbon particles or fibers, cellulose/ion exchange resins and mixtures thereof.

20. The filter capsule of claim 1 further comprising:

at least one outlet port defining an outlet port chamber wherein the port extends from, and is integral to, the capsule body, and wherein a second inner junction of the capsule body and the outlet port forms a second tapered annular wall;

a second quick connect fitting integral to the at least one outlet port;

a second check valve secured in the at least one outlet, wherein the second check valve registers against the second tapered annular wall to form a second face seal when the second check valve is in a closed position; and, a second valve retention ring secured in the capsule body and registered against the second check valve.

* * * * *